United States Patent
Socher

(10) Patent No.: US 8,182,271 B2
(45) Date of Patent: *May 22, 2012

(54) TRAINING METHOD AND SYSTEM

(75) Inventor: Katharina Socher, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1435 days.

This patent is subject to a terminal disclaimer.

(21) Appl. No.: 11/492,385

(22) Filed: Jul. 25, 2006

(65) Prior Publication Data

US 2008/0026352 A1    Jan. 31, 2008

(51) Int. Cl.
*G09B 7/00* (2006.01)
*G09B 3/00* (2006.01)

(52) U.S. Cl. ........ 434/322; 434/219; 434/262; 434/323; 434/350

(58) Field of Classification Search .................. 434/219, 434/262, 322, 323, 350
See application file for complete search history.

(56) References Cited

U.S. PATENT DOCUMENTS

| | | | | |
|---|---|---|---|---|
| 5,513,994 A | * | 5/1996 | Kershaw et al. | 434/350 |
| 6,341,212 B1 | * | 1/2002 | Shende et al. | 434/350 |
| 2003/0154405 A1 | * | 8/2003 | Harrison | 713/201 |
| 2003/0172035 A1 | * | 9/2003 | Cronce et al. | 705/59 |
| 2006/0136998 A1 | * | 6/2006 | Oowaki et al. | 726/5 |
| 2006/0199163 A1 | * | 9/2006 | Johnson | 434/322 |

FOREIGN PATENT DOCUMENTS

FR    2801262    *    5/2001

* cited by examiner

*Primary Examiner* — Xuan Thai
*Assistant Examiner* — Jerry-Daryl Fletcher
(74) *Attorney, Agent, or Firm* — Lempia Summerfield Katz LLC

(57) ABSTRACT

A system and method for certifying a trainee to use a device is disclosed. The system and method include a testing computer configured to create an answer log containing at least one answer given by the trainee to at least one question of a certification test and a centralized grading server in communication with the testing computer, the centralized grading server configured to receive the answer log from the testing computer, evaluate the answer log to determine if the trainee has passed the certification test, and provide a license file providing a license file if the trainee passes the certification test.

23 Claims, 4 Drawing Sheets

TRAINING METHOD AND SYSTEM

BACKGROUND

1. Technical Field

The present embodiments generally relate to systems and methods for training individuals to operate a device, and more particularly a medical device.

2. Background

It is costly and time consuming to train individuals to operate devices. Even more costly and time consuming is the training of individuals to operate medical devices. First, medical devices, such as x-ray, computed axial tomography ("CAT"), and magnetic resonance imaging ("MRI") devices, are considered some of the most complex devices to operate. Second, improper operation of such a device is undesired. For example, numerous medical devices use radiation, in a variety of forms, to peer into the interior of the human body without the need of invasive surgery.

Individuals who operate such devices have been rigorously trained in a variety of ways. For example, individuals may be trained by having in-person instruction. In-person instruction is highly effective because the instructor can interact with the individual to determine the individual's competency. However, in-person training is costly because of the limited number of instructors. Furthermore, individuals must synchronize their schedules in order to be in attendance when the instructor is present.

Another form of training involves training without the use of an instructor. Typically, an individual will watch a series of videos or read books containing information for operating the medical device. By so doing, the cost of hiring an instructor and the challenges of synchronizing schedules are avoided. However, this system has the drawback of not having the ability to measure the competency of the individual being trained.

BRIEF SUMMARY

A method and system for certifying a trainee to use a device is disclosed. The method includes the acts of creating an answer log containing at least one answer given by the trainee to at least one question of a certification test, sending the answer log to a centralized grading server, evaluating the answer log to determine if the trainee has passed the certification test, providing a license file if the trainee passes the certification test and uploading the license file to the device, whereby the device is activated for the trainee to operate when the license file is uploaded into the device.

The system includes a testing computer configured to create an answer log containing at least one answer given by the trainee to at least one question of a certification test and a centralized grading server in communication with the testing computer. The centralized grading server is configured to receive the answer log from the testing computer, evaluate the answer log to determine if the trainee has passed the certification test, and provide a license file providing a license file if the trainee passes the certification test.

Further objects, features and advantages will become readily apparent to persons skilled in the art after a review of the following description, with reference to the drawings and claims that are appended to and form a part of this specification.

DETAILED DESCRIPTION

Figure 1:
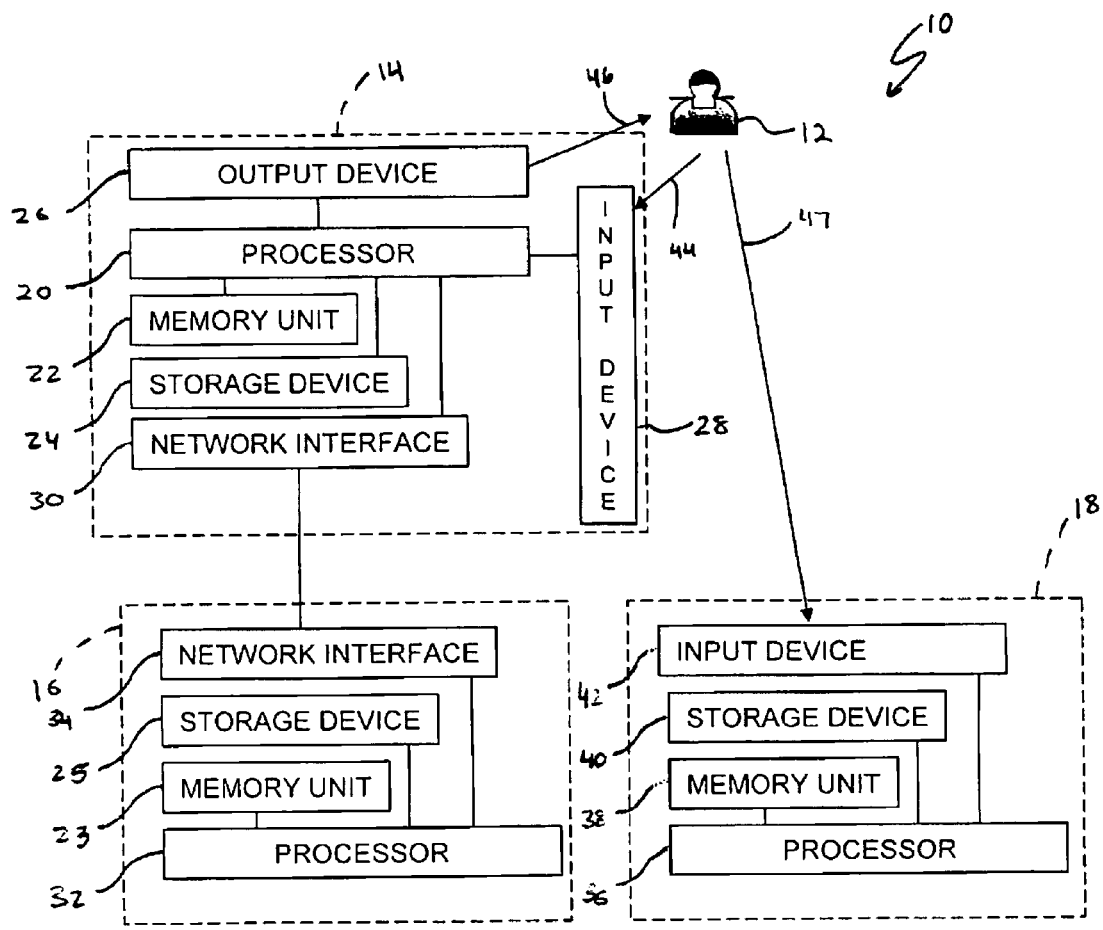
FIG. 1 is a block diagram of one embodiment of a system for certifying a trainee to use a device.

Referring to FIG. 1, a system 10 for certifying a trainee 12 is shown. The system 10 includes a testing computer 14, a grading server 16, and a device 18. As will be described in more detail, the testing computer 14 and the grading server 16 function to train the trainee 12 to operate the device 18. Additional, different or fewer components may be provided. For example, additional testing computers 14 and/or devices 18 are included in a network. As another example, the testing computer 14 is provided as part of the device 18.

The testing computer 14 is a personal computer, laptop computer, a tablet, device 18 specific computer, personal data assistant, telephone or other user interface device. The testing computer 14 includes a processor 20. The processor 20 is in communication with a memory unit 22 and a storage device 24. The memory unit 22 and/or the storage device 24 can include a set of instructions that can be executed by the processor 20 to cause the testing computer 14 to perform any one or more of the methods or computer based functions disclosed herein. The testing computer 14 may operate in the capacity as a client user computer in a server client user network environment, or as a peer computer system in a peer-to-peer (or distributed) network environment.

The processor 20 is also connected to an output device 26 and an input device 28. The output device 26 outputs data from the processor 20 to the trainee 12. The output device 26 may be a computer screen, a printer or a removable storage device.

The input device 28 allows the trainee 12 to interface with the testing computer 14. The input device 28 may be a keyboard, a curser control device, such as a mouse or trackball, or a device capable of reading computer readable medium and providing the contents of the computer readable medium to the processor 20.

The testing computer 14 also includes a network interface 30 in communication with the processor 20. The network interface 30 is a modem, Ethernet card, wireless adapter or other network interface. The network interface 30 functions to connect the testing computer 14 to a computer network. The computer network may be a local area network, a wide area network, or a distributed network, such as the Internet.

The grading server 16 is a personal computer, server, processing device connected with a network, or other device for processing testing data. Similar to the testing computer 14, the grading server 16 includes a processor 32 in communication with a memory unit 23 and a storage unit 25. The grading server 16 typically operates in the capacity of a computer network server, such as a single, centralized server or part of a network of servers operable to process testing data. The memory unit 23 and/or the storage device 25 may contain instructions that can be executed by the processor 32 to perform any one or more of the methods or computer based functions disclosed herein.

The grading server 16 also includes a network interface 34. The network interface 34 functions to provide network access for the grading server 16. The network interface 34 is a modem, port, Ethernet card or other network interface. The network interface 34 may be connected to a local area network, a wide area network, or a distributor network such as the Internet. In this embodiment, the network interface 34 of the grading server 16 is in communication with the network interface 30 of the testing computer 14. The communication is direct, such as using modems, or indirect, such as packet based communications over a network. When connected as described above, the testing computer 14 and the grading server 16 are capable of communicating to each other.

The device 18 includes a processor 36 in communication with a memory unit 38 and a storage device 40. The memory unit 38 and the storage device 40 may contain instructions executable by the processor 36 to cause the device 18 to perform any one or more of the methods or computer based functions disclosed herein. The processor 36, memory unit 38, and/or storage device 40 may be the processor 20, memory unit 22, and/or storage device 24, respectively, or separate devices.

The device 18 also includes an input device 42. The input device 42 may be a removable drive system capable of reading computer medium and providing the data from the computer readable medium to the processor 36. The input device 42 may also be a keyboard or a curser control device, such as a mouse, one of the devices listed for input device 28 or input device 28.

Figure 2:
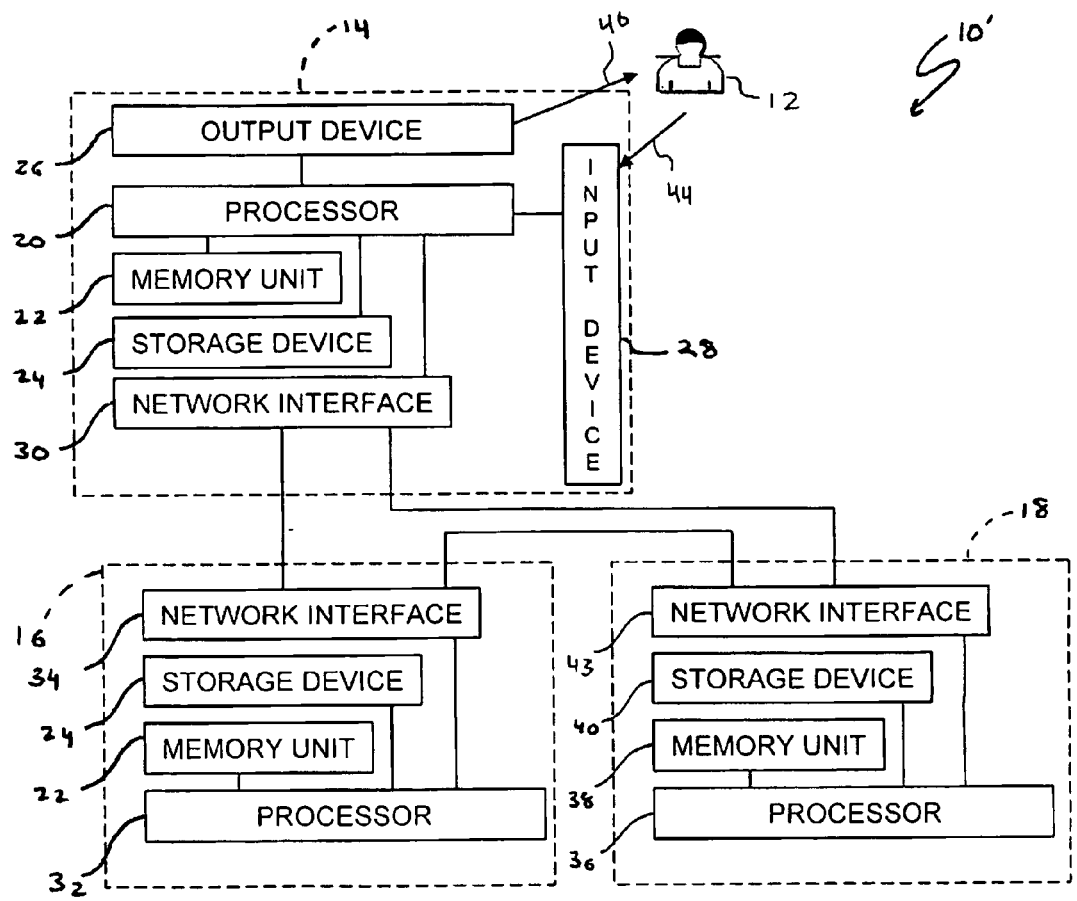
FIG. 2 is another embodiment of a system for certifying a trainee to use a device, the device having a network interface.

Referring to FIG. 2, another embodiment of the system 10' is shown. The system 10' is similar to the system 10 of FIG. 1, with the addition of a network interface 44 connected to the processor 36 of the device 18. The network interface 44 functions to provide network connectivity for the device 18. Furthermore, the network interface 44 of the device 18 is connected to the network interface 30 of the testing computer 14 and/or the network interface 34 of the grading server 16.

FIGS. 1 and 2 illustrate the testing computer 14 and the device 18 are shown as two separate devices. However, the testing computer 14 and the device 18 may be the same device.

Figure 4:
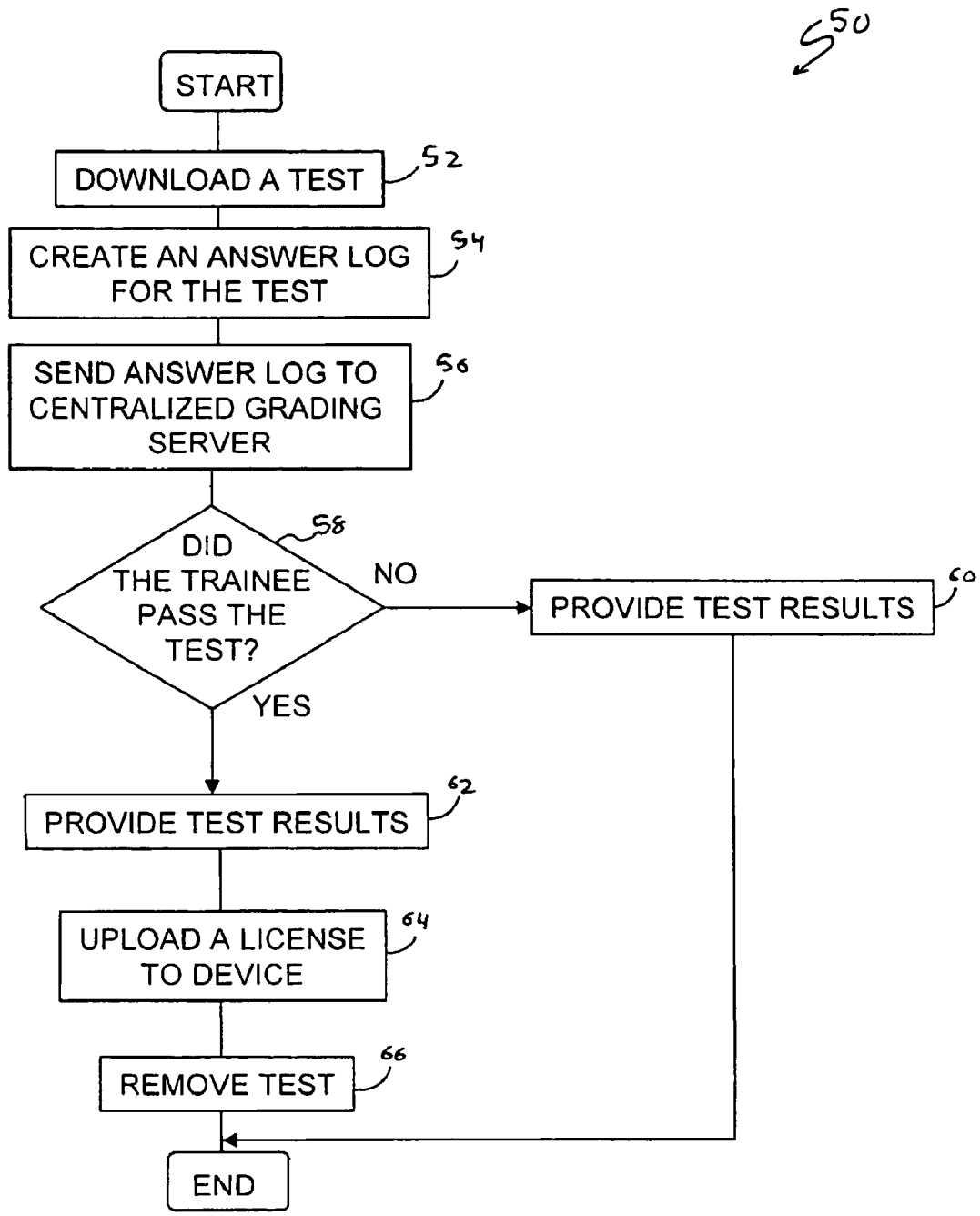
FIG. 4 is a block diagram of a method for certifying a trainee to use a device according to one embodiment.

Referring to FIG. 1 and FIG. 4, a method 50 for certifying the trainee 12 to use the device 18 is shown. In act 52, the trainee 12 uses the testing computer 14 to download a certification test. This certification test may be downloaded from the centralized grading server or may be downloaded from any other remote device. Alternatively, act 52 may be optional because the certification test may already be downloaded to or exist on the testing computer 14. Additionally, the testing computer 14 may download educational modules. These educational modules will contain information instructing the user 12 how to operate the device 18. Thereafter, the user 12 may take the certification test.

In act 54, the trainee 12 uses the input device 28 (as shown by arrow 44) to answer questions on the certification test. The questions to the certification test may be displayed on the output device 26 to the trainee 12 as shown by the arrow 46. When the trainee 12 answers questions to the certification test, the testing computer 14 creates an answer log containing the answers given the trainee 12 to the certification test. The answer log may be stored in the storage device 24 and/or the memory unit 22. The answer log includes actual answers or data derived from answers. For example, the testing computer may grade or score the answers and store the score in or as the answer log.

The certification test may be one test or may be a plurality of tests that must be completed sequentially. For example, the earlier tests could be the basics of operating the device while the later tests could be the advanced features of the device 18.

In act 56, the network interface 30 of the testing computer 14 transmits the answer related information to the network interface 34 of the grading server 16. The answer related information may then be stored in the storage device 24 and/or the memory unit 22 of the grading server 16.

As shown in act 58, the processor 32 of the grading server 16 evaluates the answer log in order to determine if the trainee 12 has passed the certification test. The evaluation may be scoring the answers, comparing a score to a threshold or matching combinations of answers for a desired pattern. The evaluation is performed automatically or by a processor, but may include user input. Alternatively, the evaluation is performed manually by a user.

In act 60, if the trainee 12 did not pass the certification test, the grading server 16 and/or the testing computer 14 provide the trainee 12 the results via the output device 26 (as shown by arrow 46). The results include correct answers, an indication of the questions incorrectly answered, the score, recommended training information or combinations thereof. Thereafter, the method 50 terminates.

As shown in act 62, if the trainee passes the certification test, grading server 16 and/or the testing computer 14 provide the trainee 12 test results via the output device 26 (as shown by arrow 46). The results include correct answers, an indication of the questions incorrectly answered, the score, recommended training information or combinations thereof. The test results are communicated in an email, a link to a webpage, and/or a message sent to the testing computer 14 or the device 18. Furthermore, the grading server 16 provides, in act 64, a license to the trainee 12 to operate the device 18. This license is provided to the trainee 12 via the output device 26 of the testing computer 14 (as shown by arrow 46). The license may be a password or may be in the form of a computer readable medium capable of interfacing with the input device 42 of the device 18. As shown by arrow 47, the license is then provided to the device 18 by the user 12.

In act 66, the testing computer 14 and/or the grading server 16 remove the certification test from the testing computer 14. Act 66 is optional and is not required. Thereafter, the method 50 terminates.

Referring to FIGS. 2 and 4, another embodiment 10' of performing the method 50 is shown. In this embodiment, the method 50 is performed as previously described with the exception that the license is uploaded to the device 18 automatically or in response to user input. This can be accomplished by connecting a network interface 43 of the device 18 to either the network interface 30 of the testing computer 14 and and/or the network interface 34 of the testing server 16. The license is uploaded from either the network interface 30 of the testing computer 14 or the network interface 34 of the centralized testing server 16 to the network interface of the device 18. By so doing, the license is automatically provided to the device 18 and does not require the interaction of the trainee 12 to input the license to the device 18. Based on use identification, the device 18 allows operation by the user as long as the user has a license.

Figure 3:
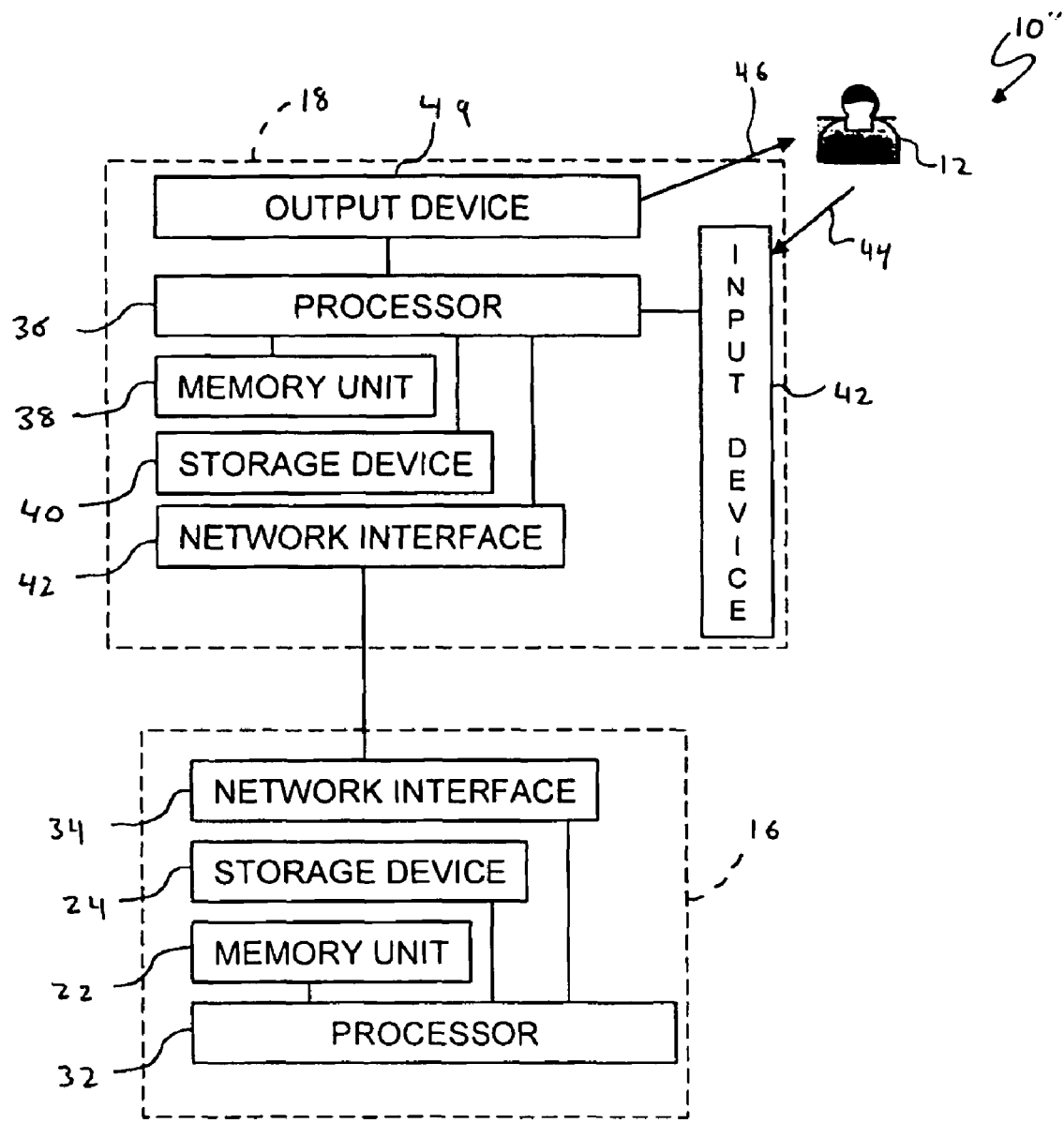
FIG. 3 is still another embodiment of a system for certifying a trainee to use a device, wherein the device certifies the trainee.

Referring to FIGS. 3 and 4, another embodiment 10" of performing the method 50 is shown. This embodiment is similar to the embodiment 10' in FIG. 2 with the exception that the device 18 includes the input device 42 and an output device 49. The output device 49 may be a computer screen, a printer or a removable storage device. In this embodiment, the device 18 acts as the testing computer 14 (as best shown in FIGS. 1 and 2 as testing computer 14) and as the device 18. By so doing, the device 18 performs the testing of the user 12 without the need of any additional hardware.

The instructions for implementing the processes, methods and/or techniques discussed above are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

A periodic update may be provided, such as repeating the testing in response to a temporal trigger. The license may be operable for a limited amount of time.

While the above description constitutes the preferred embodiment of the present invention, it will be appreciated that the invention is susceptible to modification, variation and change without departing from the proper scope and fair meaning of the accompanying claims.

The invention claimed is:

1. A method for certifying a trainee to use a medical device, the method comprising the acts of:
   creating an answer log containing at least one answer given by the trainee to at least one question of a certification test;
   sending the answer log to a grading server;
   evaluating the answer log to determine if the trainee has passed the certification test;
   providing a license file, the medical device configured to activate based on the license file when the trainee passes the certification test;
   uploading license information from the license file to the medical device to allow the operation of the medical device by the trainee.

2. The method of claim 1, wherein the act of uploading the license file comprises electronically uploading the license file from the grading server to the medical device.

3. The method of claim 1, wherein the act of uploading the license file comprises electronically uploading the license file from a testing computer to the medical device.

4. The method of claim 1, wherein the act of sending the answer log to the grading server is performed by electronically uploading the license file from a testing computer to the grading server.

5. The method of claim 1, further comprising the act of downloading the certification test from a remote server to a testing computer, the testing computer performing the act of creating an answer log.

6. The method of claim 5, wherein the remote server is the grading server.

7. The method of claim 5, further comprising the act of sending a communication to the testing computer containing a test result of the certification test.

8. The method of claim 7, wherein the communication is at least one of an email, a link to a webpage and a message sent to the testing computer.

9. The method of claim 1, further comprising the act of removing the certification test from a testing computer.

10. The method of claim 1, wherein the medical device is an x-ray device, a computed axial tomography device, or a magnetic resonance imaging device.

11. The method of claim 1, further comprising providing to the trainee recommended training information based on questions answered incorrectly on the certification test.

12. A system for certifying a trainee to use a device, the system comprising:
   a testing computer configured to create an answer log containing at least one answer given by the trainee to at least one question of a certification test;
   a grading server in communication with the testing computer, the grading server configured to receive the answer log from the testing computer, evaluate the answer log to determine if the trainee has passed the certification test, and provide a license file to activate the operation of the device when the trainee passes the certification test, the device operable only when license information contained within the license file is uploaded into the device.

13. The system of claim 12, wherein the device is a medical device.

14. The system of the claim 13, wherein the medical device is an x-ray device, a computed axial tomography device, or a magnetic resonance imaging device.

15. The system of claim 12, wherein the grading server is in communication with the device, and the grading server is configured to upload the license file from the grading server to the device.

16. The system of claim 12, wherein the testing computer is in communication with the device, and the testing computer is configured to upload the license file from the testing computer to the device.

17. The system of claim 12, wherein the license information comprises a secure password.

18. A system for certifying a trainee to use a device, the system comprising:
   a device configured to create an answer log containing at least one answer given by the trainee to at least one question of a certification test;
   a grading server in communication with the device, the grading server configured to receive the answer log from the device, evaluate the answer log to determine if the trainee has passed the certification test, and provide a license file to activate the operation of the device when the trainee passes the certification test, the device operable only when license information contained within the license file is uploaded into the device.

19. The system of claim 18, wherein the device is a medical device.

20. The system of claim 19, wherein the medical device is an x-ray device, computed axial tomography device, and magnetic resonance imaging device.

21. The system of claim 18, wherein the grading server is in communication with the device, and the grading server is configured to upload the license file from the grading server to the device.

22. In a non-transitory computer readable storage medium having stored therein data representing instructions executable by a programmed processor for enabling operation of a medical device in response to testing, the storage medium comprising instructions for:
   testing a user;
   evaluating the testing at a remote server;
   communicating a license file to activate operation of the medical device electronically to the medical device, the communicating being a function of the evaluating; and allowing operation of the medical device in response to license information in the license file.

23. The instructions of claim 22 wherein testing comprises generating an answer log from input of the user in response to questions, wherein evaluating comprises scoring as a function of the answer log, and wherein communicating comprises communicating results of the evaluating with a password or license.

* * * * *